United States Patent
Muntnich et al.

[11] Patent Number: 6,042,275
[45] Date of Patent: Mar. 28, 2000

[54] RADIAL ROLLER BEARING

[75] Inventors: Leo Muntnich, Aurachtal; Herbert Rost; Wolfgang Steinberger, both of Herzogenaurach, all of Germany

[73] Assignee: INA Walzlager Schaeffler oHG, Germany

[21] Appl. No.: 09/142,986

[22] PCT Filed: Oct. 21, 1996

[86] PCT No.: PCT/EP96/04568

§ 371 Date: Sep. 24, 1998

§ 102(e) Date: Sep. 24, 1998

[87] PCT Pub. No.: WO97/37145

PCT Pub. Date: Oct. 9, 1997

[30] Foreign Application Priority Data

Mar. 28, 1996 [DE] Germany .......................... 196 12 307

[51] Int. Cl.$^7$ .................................................. F15C 33/46
[52] U.S. Cl. ........................................ 384/580; 384/572
[58] Field of Search .................................. 384/572, 576, 384/575, 577, 578, 580

[56] References Cited

U.S. PATENT DOCUMENTS

| | | | |
|---|---|---|---|
| 2,359,120 | 9/1944 | Kilayin ..................................... | 384/580 |
| 3,051,534 | 8/1962 | Kohler et al. ............................ | 384/576 |
| 3,167,365 | 1/1965 | Helms ...................................... | 384/572 |
| 3,256,052 | 6/1966 | Howles .................................... | 384/580 |
| 3,345,723 | 10/1967 | Stilla et al. ............................ | 29/898.07 |
| 4,561,157 | 12/1985 | Johnsom ................................ | 384/572 X |
| 4,613,239 | 9/1986 | Hofmann et al. ....................... | 384/580 |
| 4,620,806 | 11/1986 | Rabe ...................................... | 384/572 |
| 5,249,872 | 10/1993 | Rhodes et al. .......................... | 384/574 |

FOREIGN PATENT DOCUMENTS

| | | |
|---|---|---|
| 0392146 | 10/1990 | European Pat. Off. . |
| 2107436 | 5/1972 | France . |
| 1290382 | 3/1969 | Germany . |
| 1954642 | 5/1971 | Germany . |
| 3327623 | 2/1985 | Germany . |
| 3543364 | 6/1987 | Germany . |
| 3723168 | 2/1989 | Germany . |
| 2132285 | 7/1984 | United Kingdom . |
| 2166813 | 5/1986 | United Kingdom . |
| 2253248 | 9/1992 | United Kingdom . |

*Primary Examiner*—Thomas R. Hannon
*Attorney, Agent, or Firm*—Bierman, Muserlian and Lucas

[57] ABSTRACT

The pockets (10) of a cage (5) of a radial rolling bearing comprise retention elements on the inner rolling element holding member or on the outer rolling element holding member which retain the rolling elements (6) in contact with an outer raceway or an inner raceway during the mounting operation. In this way, a sag of the cylinder rollers (6) due to the force of gravity is prevented so that a shaft (4) can be pushed into the bearing without any problem.

These retention elements have such a filigree and elastically deformable configuration that they are ineffective during the operation of the bearing after a few rotations so that a normal operational clearance is established between the rolling elements (6) and the cage (5).

5 Claims, 2 Drawing Sheets

RADIAL ROLLER BEARING

FIELD OF THE INVENTION

The invention concerns a radial rolling bearing, particularly a cylinder roller bearing, comprising an outer and/or inner ring with associated rolling elements guided in pockets of a cage, and means which retain the rolling elements in contact with an outer raceway or an inner raceway.

BACKGROUND OF THE INVENTION

Rolling element crown rings, especially those installed in bearings often manifest a large rolling element sag, i.e., the rolling elements fall downwards within the pocket due to the force of gravity so that a gap arises between their rolling contact surface and the outer raceway. This sag has the effect that a shaft which has to be introduced into the bearing abuts with its end face against the end faces of individual cylinder rollers thus causing problems in the introduction of the shaft into the bearing. Due to this, an automatic assembly is not possible.

According to the solution described in U.S. Pat. No. 3,051,534, this sag of the rolling elements is prevented by arranging a second ring above or below the actual cage, said ring comprising retaining sections which press the rolling elements guided in the cage against the inner or the outer raceway, as the case may be.

However, this type of rolling element retention is very complicated and thus also expensive because, besides the actual bearing cage, a further retaining element has to be manufactured and installed in the bearing. In addition, such a solution incorporates the danger that due to the close guidance between the rolling elements and the cage, or between the rolling elements and the additional ring, the operation of the bearing is impaired.

SUMMARY OF THE INVENTION

It is therefore the object of the invention to provide a simple solution for the retention of rolling elements in a bearing which, on the one hand prevents a sag of the rolling elements during mounting and, on the other hand, does not impair the operation of the bearing.

The invention achieves this object where in by the fact that the means on the inner rolling element holding member or on the outer rolling element holding member, as the case may be, are arranged in the pockets of the cage and have a filigree and elastically deformable configuration so that, after a few rotations of the bearing, a normal operational clearance is established between the rolling elements and the cage due to the elasticity, deformability or wear of said means.

This means that the initially existing means on the inner or outer rolling element holding member ensure that the cage retains the rolling elements in bearing relationship to the raceway during the mounting operation so that, when a shaft is inserted into the bearing, it does not strike the end faces of the cylinder rollers. During operation of the bearing, i.e., after a few rotations of the bearing, these means become ineffective due to elastic deformation or wear so that, as previously described, a normal clearance can be established between the cage and the rolling elements.

Due to the formation of a structural unit comprised of the cage and the means for holding the rolling elements in a defined position, the costs of manufacture are also reduced because, in place of two elements, it is now only necessary to produce one element, and the assembly of the entire bearing is simplified because, again, only one component, i.e. the cage, has to be mounted.

Advantageously, in a further development of the invention, the means comprise two retention elements which point in radial direction and are arranged on one side of pockets in axially spaced relationship to each other, opposite which retention elements in peripheral direction, two complementary retention elements are arranged on the other side of the pockets.

During the mounting of the bearing, these four retention elements, which can be integrated without any problem into the cage during the manufacturing process thereof, assure a reliable support of the rolling elements on the inner or the outer ring, as the case may be, depending on whether the retention elements are arranged on the outer rolling element holding member or on the inner rolling element holding member. These point-type retention elements offer less resistance to deformation and wear and are therefore particularly suitable.

A depression is arranged next to the retention elements at least on one side, into which depression the retention elements can advantageously deflect during rotation of the bearing, so that a normal operational clearance is assured.

Finally, the rolling elements are configured as needles and the rolling element crown ring is used for mounting an idler pinion in a transmission. This enables a simpler mounting of the transmission.

The invention will now be described more closely with reference to one example of embodiment.

DETAILED DESCRIPTION OF THE DRAWINGS

Figure 1:
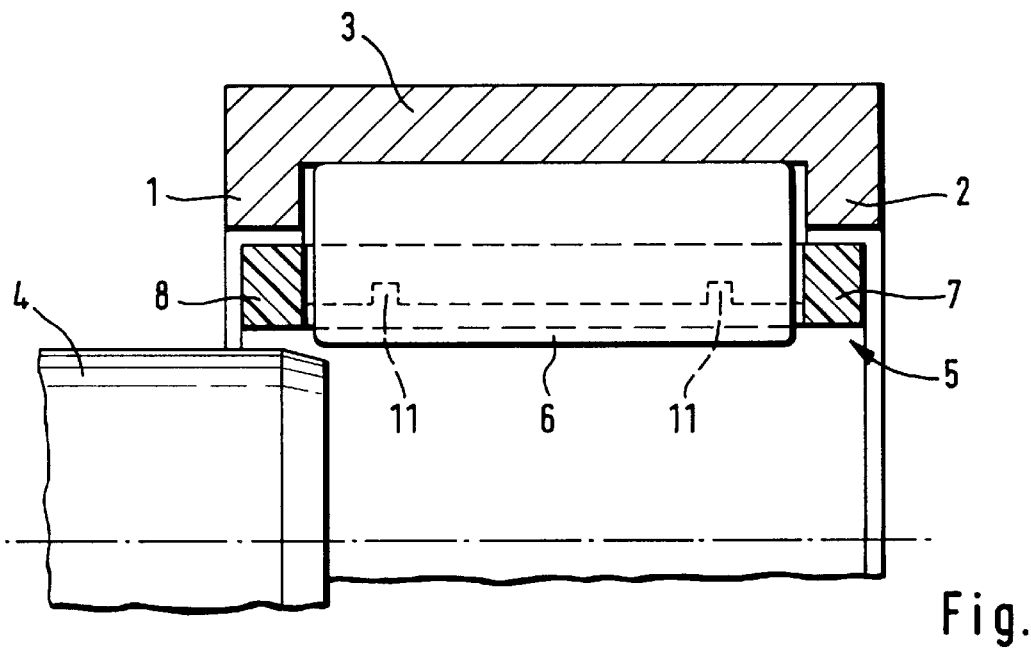
FIG. 1 is a longitudinal section through a radial bearing.
Figure 2:
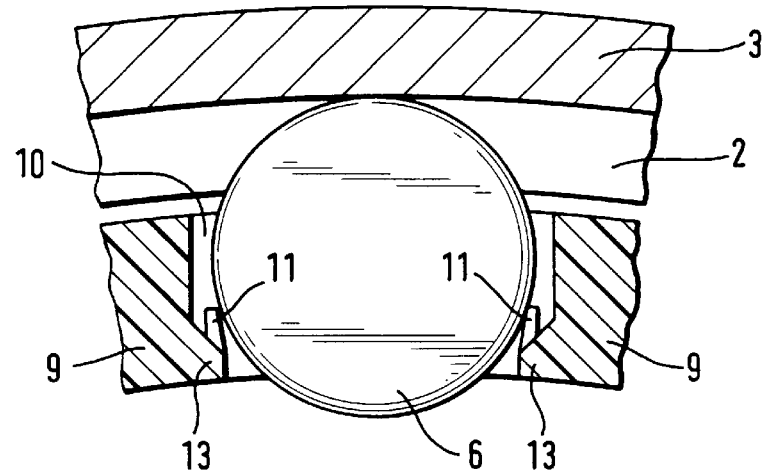
FIG. 2 is a cross-section through a radial bearing.

The bearing arrangement shown in FIGS. 1 and 2 comprises an outer ring 3 having two flanges 1 and 2, and a shaft 4, cylindrical rollers 6 being guided in a cage 5 between the outer ring 3 and the shaft 4 for rolling contact therewith. The cage 5 comprises two side rings 7 and 8 which are connected to each other by crossbars 9 so that pockets 10 are formed for receiving the rolling elements 6.

The crossbars 9, each defining a pocket 10, comprise two axially spaced retention elements 11 each, so that the cylinder rollers 6 are pressed against a raceway, not referenced, of the outer ring 3. In this way, a sag of the cylinder rollers 6 due to gravitational force is avoided so that the shaft 4 cannot come to abut with its end face against the end faces of the cylinder rollers 6 on being pushed into the bearing. During operation of the bearing, however, the four point-type retention elements are very rapidly ground off by the cylinder rollers 6 so that the required clearance between the cage 5 and the rolling elements 6 is established.

Figure 3:
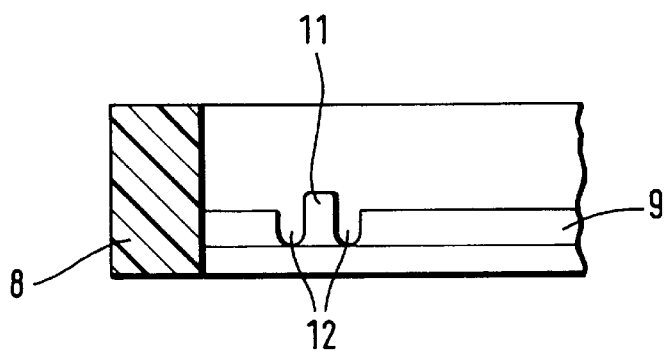
FIG. 3 is a partial section of a bearing cage.

As can further be seen in FIG. 3, a depression 12 is arranged on each side of the retention elements 11 on the crossbars 9. In this way, when a pressure is exerted by the rolling element 6 during the rotation of the bearing, the retention element 11 can deflect into the depression 12.

In contrast, in the absence of the retention elements 11, gravitational force causes the cylinder rollers 6 to sink downwards, i.e., a gap is formed between the raceway of the outer ring 3 and the rolling contact surface of the cylinder roller 6, and the shaft 4 abuts against the end face of the cylinder roller 6 when pushed into the bearing.

In the illustrated example, the retention elements 11 are arranged on the inner rolling element holding member 13 so that the cylinder rollers 6 are pressed against the outer raceway of the ring 3. In an inverse arrangement, it is, however, also possible to arrange the retention elements 11 on the outer rolling element holding member so that the cylinder rollers 6 are pressed radially inwards.

Figure 4:
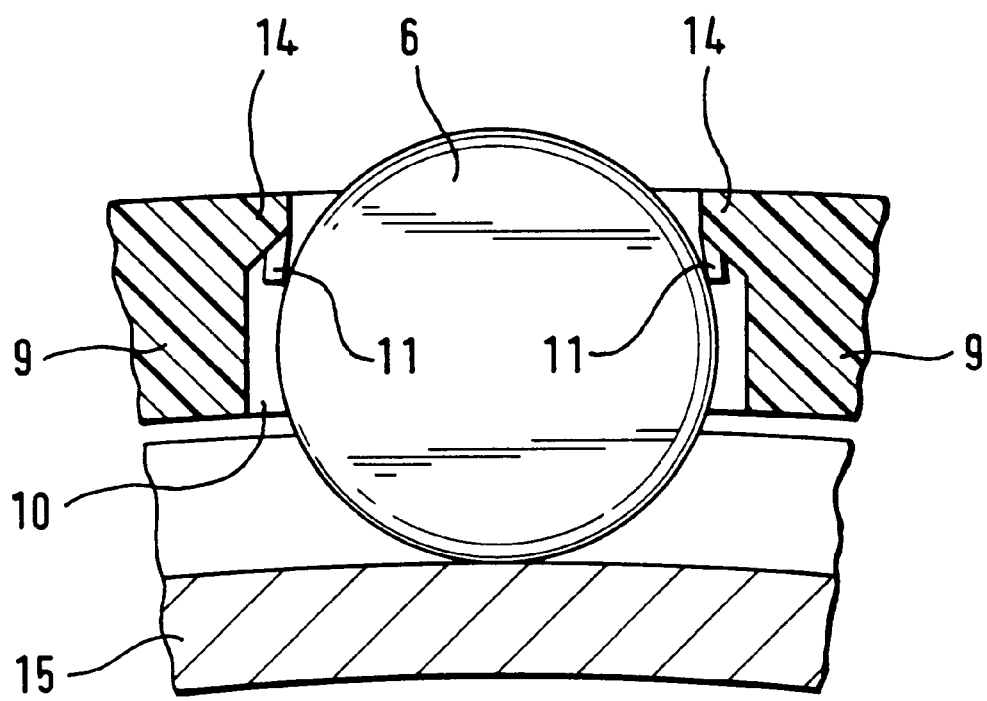
FIG. 4 is a cross-section through a radial bearing.

FIG. 4 illustrates a radial bearing of the invention comprising an inner ring 15 with associated rolling elements guided in pockets of a cage and retaining means for retaining the rolling elements in contact with the inner raceway, said retaining means being arranged in the pockets of the cage of an outer rolling element holding member 14 and have a filigree and a radial rolling bearing comprising an outer ring with associated rolling elements guided in pockets of a cage, and retaining means for retaining the rolling elements in contact with an outer raceway, wherein said retaining means are arranged in the pockets of the cage on an inner rolling element holding member and have a filigree and elastically deformable configuration so that, after a few rotations of the bearing, a normal operational clearance is established between the rolling elements of the cage due to elasticity, deformability or wear of said retaining means.

What is claimed is:

1. A radial rolling bearing comprising an outer ring with associated rolling elements guided in pockets of a cage, and retaining means for retaining the rolling elements in contact with an outer raceway, wherein said retaining means are arranged in the pockets of the cage on an inner rolling element holding member and have a filigree and elastically deformable configuration so that, after a few rotations of the bearing, a normal operational clearance is established between the rolling elements of the cage due to elasticity, deformability or wear of said retaining means.

2. A radial rolling bearing of claim 1 wherein the retaining means on the inner rolling element holding member comprise two first retention elements which extend in radial direction and are arranged on one side of the pockets in axially spaced relationship to each other, and two complementary retention elements are arranged on the other side of the pockets peripherally opposite to said two first retention elements.

3. A radial rolling bearing of claim 2 wherein a depression is arranged next to the retention elements at least on one side.

4. A radial rolling bearing of claim 1 wherein the rolling elements are configured as needles, and a rolling element crown ring is used for mounting an idler pinion in a transmission.

5. A radial rolling bearing comprising an inner ring with associated rolling elements guided in pockets of a cage, and retaining means for retaining the rolling elements in contact with an inner raceway, wherein said retaining means are arranged in the pockets of the cage on an outer rolling element holding member and have a filigree and elastically deformable configuration so that. after a few rotations of the bearing, a normal operational clearance is established between the rolling elements and the cage due to elasticity, deformability or wear of said retaining means.

* * * * *